US009055525B2

(12) United States Patent
Shim et al.

(10) Patent No.: US 9,055,525 B2
(45) Date of Patent: Jun. 9, 2015

(54) METHOD AND APPARATUS FOR ACQUIRING SYNCHRONIZATION IN CODE DIVISION MULTIPLE ACCESS SYSTEM

(71) Applicant: Samsung Electronics Co. Ltd., Suwon-si, Gyeonggi-do (KR)

(72) Inventors: Myung-Joon Shim, Suwon-si (KR); Seung-Hwan Won, Hanam-si (KR); Sang-Won Choi, Yongin-si (KR); Jong-Gun Moon, Suwon-si (KR); Jong-Yoon Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/938,846

(22) Filed: Jul. 10, 2013

(65) Prior Publication Data
US 2014/0254580 A1 Sep. 11, 2014

(30) Foreign Application Priority Data

Mar. 11, 2013 (KR) .......................... 10-2013-0025622

(51) Int. Cl.
*H04W 56/00* (2009.01)
(52) U.S. Cl.
CPC ..................................... *H04W 56/00* (2013.01)

(58) Field of Classification Search
CPC .. H04W 56/00; H04W 56/001; H04W 56/002
USPC .......................................... 370/342, 335, 350
See application file for complete search history.

(56) References Cited

U.S. PATENT DOCUMENTS

| 5,915,214 | A  | * | 6/1999  | Reece et al. ................. 455/406 |
| 6,256,337 | B1 |   | 7/2001  | Hendrickson et al. |
| 6,662,154 | B2 | * | 12/2003 | Mittal et al. ................. 704/219 |
| 7,016,400 | B2 | * | 3/2006  | Goto ............................ 375/150 |
| 2002/0085527 | A1 | * | 7/2002 | Song ........................... 370/337 |
| 2004/0091072 | A1 | * | 5/2004 | Lee .............................. 375/354 |
| 2010/0007543 | A1 | * | 1/2010 | Mueck .......................... 341/200 |
| 2010/0222050 | A1 | * | 9/2010 | Tsuboi et al. ............... 455/422.1 |

* cited by examiner

*Primary Examiner* — Mohammad Anwar
(74) *Attorney, Agent, or Firm* — Jefferson IP Law, LLP

(57) ABSTRACT

A method of acquiring initial synchronization in a code division multiple access mobile communication system is provided. The method includes quantizing a received signal into a plurality of levels, calculating correlation values of the quantized received signal and a local code, calculating absolute values of the correlation values, and detecting a position of a maximum value which exceeds a threshold among the absolute values and an ID of a downlink synchronization (SYNC-DL) sequence and determining timing values of available cells and energy values corresponding to the timing values.

16 Claims, 4 Drawing Sheets

METHOD AND APPARATUS FOR ACQUIRING SYNCHRONIZATION IN CODE DIVISION MULTIPLE ACCESS SYSTEM

PRIORITY

This application claims the benefit under 35 U.S.C. §119(a) of a Korean patent application filed on Mar. 11, 2013 in the Korean Intellectual Property Office and assigned Serial No. 10-2013-0025622, the entire disclosure of which is hereby incorporated by reference.

BACKGROUND OF THE INVENTION

1. Field of the Invention

The present invention relates to a Code Division Multiple Access (CDMA) system. More particularly, the present invention relates to a method and an apparatus for acquiring initial synchronization in a CDMA system.

2. Description of the Related Art

A Time Division Duplex (TDD) scheme is applied to a CDMA system, and the CDMA system based on the TDD scheme can use the same frequency band shared by both a downlink and an uplink and freely control and operate data capacities thereof by changing allocation of Time Slots (hereinafter, referred to as "TSs") depending on a condition. Among such types of systems, a Time Division Synchronous Code Division Multiple Access (TD-SCDMA) system has been commercialized and is currently used in China.

FIG. 1 illustrates a structure of a sub-frame used in TD-SCDMA according to the related art.

Referring to FIG. 1, one sub-frames includes seven TSs having the same length for data transmission and a Special Time Slot (STS). The STS is used to distinguish between the downlink and the uplink, and includes a Downlink Pilot Time Slot (DwPTS), a Guard Period (GP), and an Uplink Pilot Time Slot (UpPTS). The DwPTS and the UpPTS include information for physical transmission synchronization. That is, a sequence for synchronization of forward link transmission is transmitted in a DwPTS field and a sequence for synchronization of reverse link transmission is transmitted in an UpPTS field. The TS in which data transmission is performed includes a data symbol interval and a mid-amble, and user data is included in the data symbol interval and includes pilot signal information for a mid-amble channel estimation. In general, TS0 is mainly used for data transmission for a broadcasting channel within a cell, TS1 is always used for uplink data transmission, and TS2 to TS6 are used for uplink or downlink data transmission according to higher allocation. Basically, TS1 and TS2 are allocated to the uplink, and TS3 to TS6 are allocated to the downlink. D and U within each TS block refer to the downlink and the uplink, respectively.

FIG. 2 illustrates a detailed structure of the DwPTS used for initial synchronization acquisition in the downlink according to the related art.

Referring to FIG. 2, the DwPTS includes GP and downlink synchronization (SYNC-DL) codes. The SYNC-DL code is transmitted with constant power and is not spread. Power of a SYNC-DL sequence is determined by higher layer signaling.

When the CDMA system based on the TDD scheme is initially driven, initial synchronization acquisition is necessary. The initial synchronization acquisition generally includes three steps described below and may be embodied in various types according to the implementation.

1. First Step: Search of the DwPTS and Identification of the SYNC-DL Sequence

A SYNC-DL sequence index is determined by performing slot synchronization by using the SYNC-DL sequence in the DwPTS in a second TS (STS) of one sub-frame. This is determined through comparison between a threshold and a maximum value from 32×6400 hypotheses acquired by performing a correlation through a matched filter. At this time, it may be required to acquire a plurality of hypotheses in consideration of several cells and the number of effective multi-path for each cell.

2. Second Step: Identification of Scrambling and Basic Mid-amble Codes

A corresponding mid-amble code group can be known from the SYNC-DL sequence acquired in the first step, i.e., Search of the DwPTS and identification of the SYNC-DL sequence, and a corresponding mid-amble code is identified among four basic mid-amble codes included in the group. The identified mid-amble code is equally used during one sub-frame. Further, since a relation between the mid-amble code and the scrambling code corresponds to a one-to-one correspondence mapping relation, when the mid-amble code is determined, the scrambling code is automatically determined. A correlation between the mid-amble code and the scrambling code is shown in Table 1 below.

TABLE 1

| Code Group | Associated Codes | | | |
|---|---|---|---|---|
| | SYNC-DL ID | SYNC-UL ID | Scrambling Code ID | Basic Mid-amble Code ID |
| Group 1 | 0 | 0...7 | 0 | 0 |
| | | | 1 | 1 |
| | | | 2 | 2 |
| | | | 3 | 3 |
| Group 2 | 1 | 8...15 | 4 | 4 |
| | | | 5 | 5 |
| | | | 6 | 6 |
| | | | 7 | 7 |
| . | | . | | |
| Group 32 | 31 | 248...255 | 124 | 124 |
| | | | 125 | 125 |
| | | | 126 | 126 |
| | | | 127 | 127 |

3. Third Step: Control Multi-frame Synchronization

A phase of a channel value through a mid-amble of a Primary-Common Control Physical CHannel (P-CCPCH) is reflected to the SYNC-DL, and a position of a control multi-frame is determined by using information on a phase of the DwPTS.

4. Forth Step: Broadcasting CHannel (BCH) Decoding

Only when a CRC becomes "Good" through demodulation of the BCH are all the steps successfully completed and general communication starts. Such a step may not be included in an initial synchronization process.

Meanwhile, in the DCMA system based on the TDD scheme, channels related to initial synchronization having the structure shown in FIG. 1 are periodically received. Particularly, since the SYNC-DL including 64 chips is received every 5 ms interval in the TD-SCDMA system, the TD-SCDMA system has relatively low detection capabilities in comparison with Wide-band Code Division Multiple Access (W-DDCMA)/Frequency Division Duplex (FDD) systems in which initial synchronization is acquired using successively received pilot channels.

Accordingly, the TDD system acquires initial timing synchronization through the following two methods.

A first method finds an approximate position by using a power ratio between a SYNC-DL signal which exists in one sub-frame and a GAP adjacent to the SYNC-DL signal and then re-searches the vicinity of the position through a Maximum Likelihood (ML) scheme. Through the method, an approximate position is found by calculating a power ratio ((GP_left+GP_right)power/SYNC-DL power) between the SYNC-DL signal and GPs adjacent to a left side and a right side of the SYNC-DL in every sub-frame. At this time, the power ratio can be set and calculated as a chip interval or a multiple of the chip interval. However, since the method using the power ratio has low accuracy, a region having a minimum value should be found through the observation during significantly many sub-frames, and afterward energy is accumulated for every half chip by using the ML scheme for a predetermined interval in order to find accurate timing information in the unit of half chips in the decreased search interval. Thereafter, a position which is reported to have the highest energy is determined as a final timing position. Since the method requires only the calculation of the power ratio, a receiver structure is relatively simple. Further, since a first synchronization acquisition search interval is limited to the vicinity of the approximately found position, complexity can be reduced and a small size memory can be used. However, the method takes two or three times as long in comparison with a second method to find the accurate position, so that large degradation of the capability of this method should be expected.

The second method is a method of detecting a signal of one sub-frame by using the ML scheme, acquiring initial timing, and acquiring a code ID used as a corresponding pilot. For example, in TD-SCDMA, the method searches and compares energy amounts accumulated in all positions of entire sub-frame intervals (that is, 6400 chips) by using the ML scheme, and then calculates a SYNC-DL code having a largest energy value and a position determined in the unit of half chips. Although the method also calculates a final position through the observation for a plurality of sub-frame intervals, it takes less than half the time to acquire initial timing in comparison with the first method. However, since the method can determine the final position only when having energy values of all positions, memory size needs to be large. Accordingly, the method has a benefit in an aspect of the capability, but has a problem in an aspect of the complexity and memory size. Further, the second method can achieve the originally intended capability when there is only the downlink, but significant capability degradation is generated when an uplink signal transmitted from another terminal is located in the same frequency band.

In addition, in the first and second steps of the initial synchronization acquisition, when detection of the signal timing and acquisition of the SYNC-DL/Mid-amble ID is successfully declared, the subsequent step is performed. Mean Cell Search Time (MCST) may increase due to a false alarm which may be generated at this time. Particularly, when an error is generated due to the false alarm in the second step, a back side estimates a wrong residual frequency offset, and frame synchronization acquisition in the third step fails. Accordingly, the second step should be performed again, but this requires a lot of time. Therefore, it is required to minimize generation of the false alarm. However, it is difficult to acquire the desired capability just by simply controlling a threshold value. Further, when an initial synchronization acquiring process is performed in a place where a signal does not exist, the false alarm may be generated and thus an unnecessary cell searching process may be additionally performed. Accordingly, an additional reliability check algorithm is needed to reduce capability degradation due to the false alarm.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for acquiring effective initial synchronization timing in a CDMA downlink system based on a TDD scheme.

Another aspect of the present invention is to provide a scheme of acquiring initial synchronization timing and improving reliability to solve a problem in which MCST increases due to a false alarm.

In accordance with an aspect of the present invention, a method of acquiring initial synchronization in a code division multiple access mobile communication system is provided. The method includes quantizing a received signal into a plurality of levels, calculating correlation values of the quantized received signal and a local code, calculating absolute values of the correlation values, and detecting a position of a maximum value which exceeds a threshold among the absolute values and an ID of a SYNC-DL sequence and determining timing values of available cells and energy values corresponding to the timing values.

In accordance with another aspect of the present invention, an apparatus for acquiring initial synchronization in a code division multiple access mobile communication system is provided. The apparatus includes a quantizer which quantizes a received signal into a plurality of levels, a matched filter which calculates correlation values of the quantized received signal and a local code, an absolute value calculator which calculates absolute values of the correlation values, and a peak detector which detects a position of a maximum value which exceeds a threshold among the absolute values and an ID of a SYNC-DL sequence and determines timing values of available cells and energy values corresponding to the timing values.

In an exemplary implementation, by using the method applied to the first step, i.e., Search of the DwPTS and identification of the SYNC-DL sequence, of the initial synchronization acquisition, the capability in the ML or hybrid scheme can be applied and the memory size can be suitably reduced. The memory size can be further reduced by dividing the search interval.

Further, by applying the additional check method of improving the reliability to the first and second steps of the initial synchronization acquisition, MCST which increases due to the false alarm can be significantly reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a CDMA based system, all channels are distinguished by a channelization code, and information on the cell can be acquired through reception of control related information transmitted from a base station. Accordingly, the terminal requires acquisition of information on initial synchronization of the desired cell to acquire the control related information. Further, since there is a channel including information for initial synchronization acquisition in a specific TS, the TDD system should perform an initial synchronization acquiring process by acquiring timing and a code ID of a pilot sequence such as the periodically transmitted SYNC-DL code of TD-SCDMA.

Figure 1:
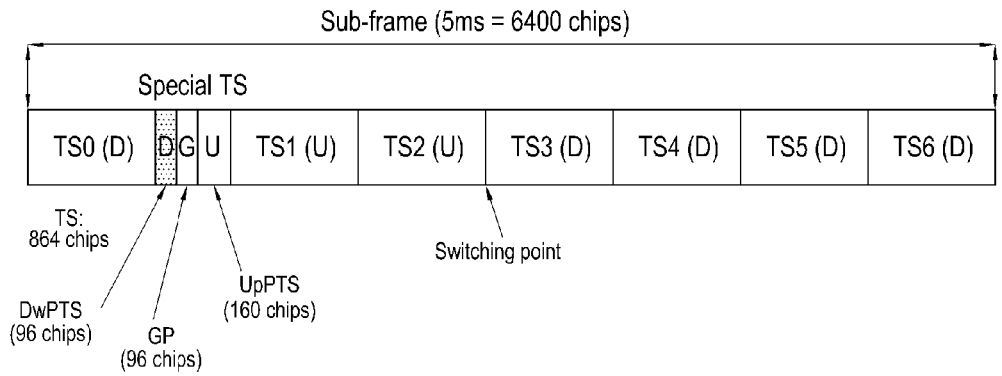
FIG. 1 illustrates a structure of a sub-frame used in TD-SCDMA according to the related art.
Figure 2:
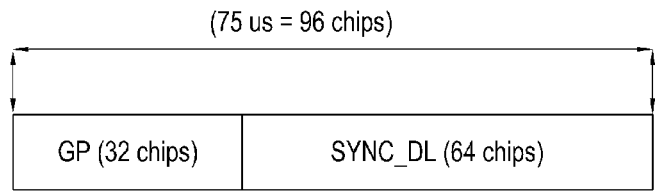
FIG. 2 illustrates a detailed structure of a DwPTS used for initial synchronization acquisition in a downlink according to the related art.
Figure 3:
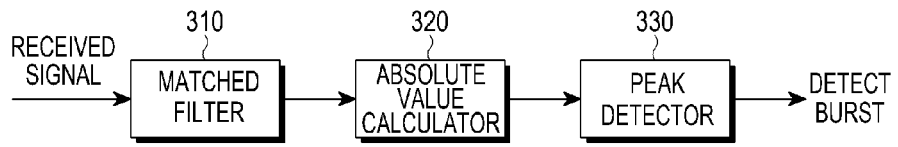
FIG. 3 illustrates a configuration of an apparatus for acquiring general initial synchronization according to an exemplary embodiment of the present invention.

FIG. 3 illustrates a configuration of an apparatus for acquiring general initial synchronization according to an exemplary embodiment of the present invention.

Referring to FIG. 3, the apparatus for acquiring initial synchronization includes a matched filter 310, an absolute value calculator 320, and a peak detector 330.

The matched filter 310 correlates a local code corresponding to the SYNC-DL sequence generated in a local code generator (not shown) and a received signal. There may be thirty two SYNC-DL sequences. When the received signal matches a SYNC-DL code transmitted from a base station, the SYNC-DL code has a high correlation characteristic in comparison with another code. The absolute value calculator 320 calculates an absolute value of an output value of the matched filter 310 and accumulates energy values for respective locations over several sub-frames in order to guarantee higher reliability. The peak detector 330 compares the energy values calculated in all candidate group locations to find a maximum value, and detects a location and SYNC-DL ID corresponding to the maximum value. Based on a result of the peak detector 330, a controller (not shown) performs a process of distinguishing effective path information.

Meanwhile, a factor influencing DwPTS detection in the TDD mode is a ratio of power values of the uplink TS and the downlink TS. However, since information on existence of the uplink TS or the downlink TS and related timing information cannot be known in the initial synchronization acquisition, uplink transmitted power of another terminal which is significantly larger than downlink signal power may be received, and accordingly, instability of the power value may be considered as being greater. Particularly, when the terminal is located on a cell boundary, a difference between transmitted power of another terminal and the power value of the received signal may be several tens of dBs or more. In this case, the detection capability in the synchronization acquiring process in the first step based on the conventional ML scheme sharply deteriorates.

According to the exemplary embodiment of the present invention, a sign of the received signal is determined and a Multiplayer Quantization (MQ) which is a scheme of performing the quantization into a plurality of levels is applied in the initial synchronization acquisition.

Figure 4:
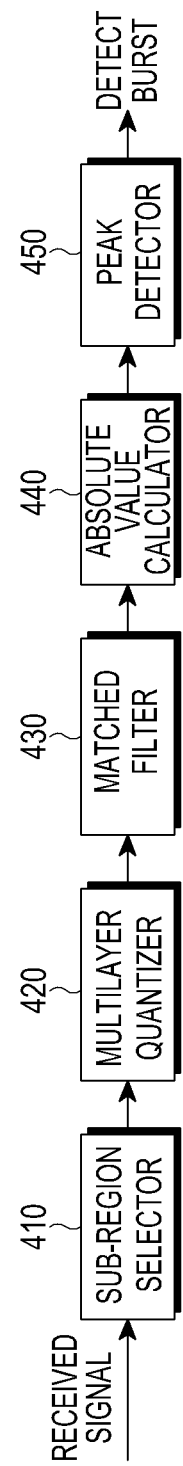
FIG. 4 illustrates a configuration of an apparatus for acquiring initial synchronization according to an exemplary embodiment of the present invention.

FIG. 4 illustrates a configuration of an apparatus for acquiring initial synchronization according to an exemplary embodiment of the present invention.

Referring to FIG. 4, the apparatus for acquiring the initial synchronization according to the exemplary embodiment of the present invention includes a sub-region selector 410, a multilayer quantizer 420, a matched filter 430, an absolute value calculator 440, and a peak detector 450.

The sub-region selector 410 will be described later.

The multilayer quantizer 420 maps the received signal into values or signs in predetermined levels. For example, the signal can be processed through a binary quantization of dividing the received signal by using the sign. Since an operation of acquiring the synchronization by using the quantized received signal is the same as that of FIG. 3, a redundant description thereof will be omitted.

As described above, when the received signal is quantized in various levels, an error by a signal of another terminal which is larger by several tens of dBs generated in the conventional method is not generated even though a large signal enters the uplink interval. That is, since an excessively large level signal is saturated, generation of incorrect information by which the excessively measured value is generated is blocked.

Accordingly, it is possible to solve the problem generated in the initial synchronization acquisition using the ML scheme in the CDMA based on the TDD.

Thereafter, the multilayer quantizer 420 according to an exemplary embodiment of the present invention will be described.

Figure 5:
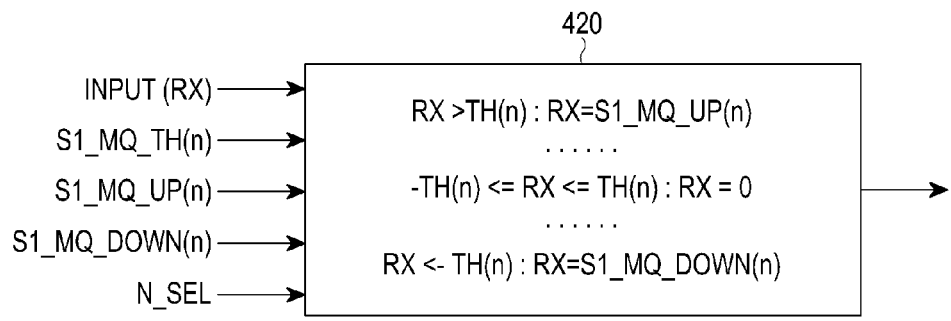
FIG. 5 illustrates a configuration of a multilayer quantizer according to an exemplary embodiment of the present invention.

FIG. 5 illustrates a configuration of the multilayer quantizer according to an exemplary embodiment of the present invention.

Referring to FIG. 5, the multilayer quantizer 420 according to the exemplary embodiment of the present invention receives a plurality of input signals, quantizes the received signals into a plurality of levels, and then outputs the quantized signals. Among the input signals, INPUT(RX) is a received signal and N_SEL is a value for setting the number of levels. When the value is 1, the signal is quantized into a binary value. S1_MQ_TH(n) is a predefined threshold, which can be set as a value equal to or larger than 1 according to an input signal level. In a case of the binary quantization, the value is set as 1. S1_MQ_UP/DOWN(n) presents a reference by which S1_MQ_TH(n) is compared with input values and then the values are quantized into particular values. In the case of the binary quantization, S1_MQ_UP(n) and S1_MQ_DOWN(n) can be set as +1 and −1, respectively. The multilayer quantization according to the exemplary embodiment of the present invention may be uniformly performed for entire intervals, and a width of each level may be differently set by providing a weight to a particular region.

Next, the sub-region selector 410 according to the exemplary embodiment of the present invention will be described.

Although 6400 chip intervals corresponding to entire search regions should be searched in the first step when the initial synchronization is acquired through the ML scheme, the first step of the synchronization acquisition may be performed with several sub-regions divided from the entire search intervals in order to reduce the complexity of the process. The sub-region selector 410 is not a mandatory component, and may be applied or not according to a size of a memory to be used in the terminal.

Figure 6:
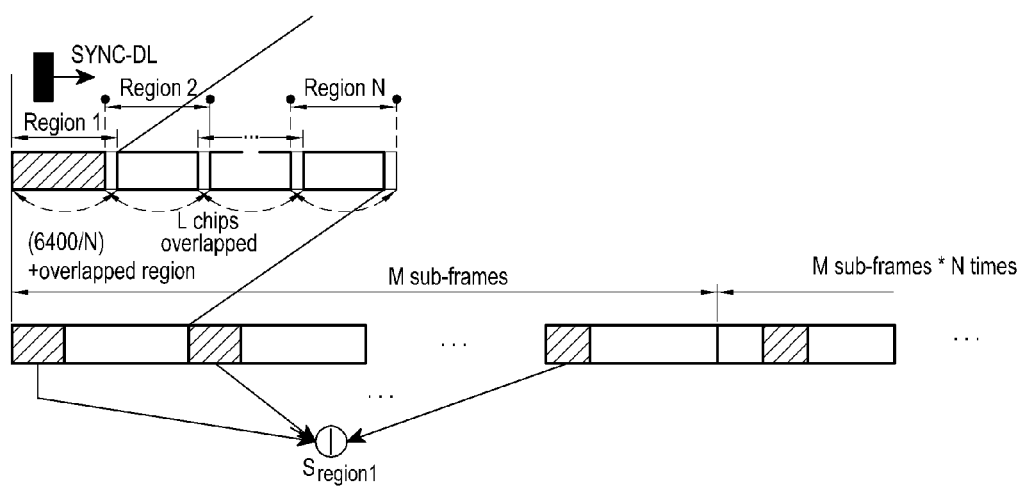
FIG. 6 illustrates a process where a search is performed in the unit of sub-regions according to an exemplary embodiment of the present invention.

FIG. 6 illustrates a case where a search is performed in the unit of sub-regions according to an exemplary embodiment of the present invention.

Referring to FIG. 6, when an entire region is divided into N sub-regions, energy is accumulated in every sub-region over M sub-frames time and a position and an energy value of a candidate group are stored. Predetermined intervals of the respective sub-regions overlap each other in order to include all search intervals. Thereafter, when a signal is detected through a comparison with a particular threshold, the first step of the initial synchronization acquisition ends. However, when the signal is not detected, the operations are performed for all sub-regions until the signal is detected and then a position having a largest energy value is finally found. Accordingly, unlike the aforementioned ML scheme, the scheme corresponds to a hybrid detection scheme since it detects the signal in a particular region through the ML scheme and determines whether the value is effective by using a predetermined threshold. Here, an order of finding sub-regions may be randomly set, and may not be sequentially ordered such as Region1→Region3→Region2→ . . . →RegionN.

Figure 7:
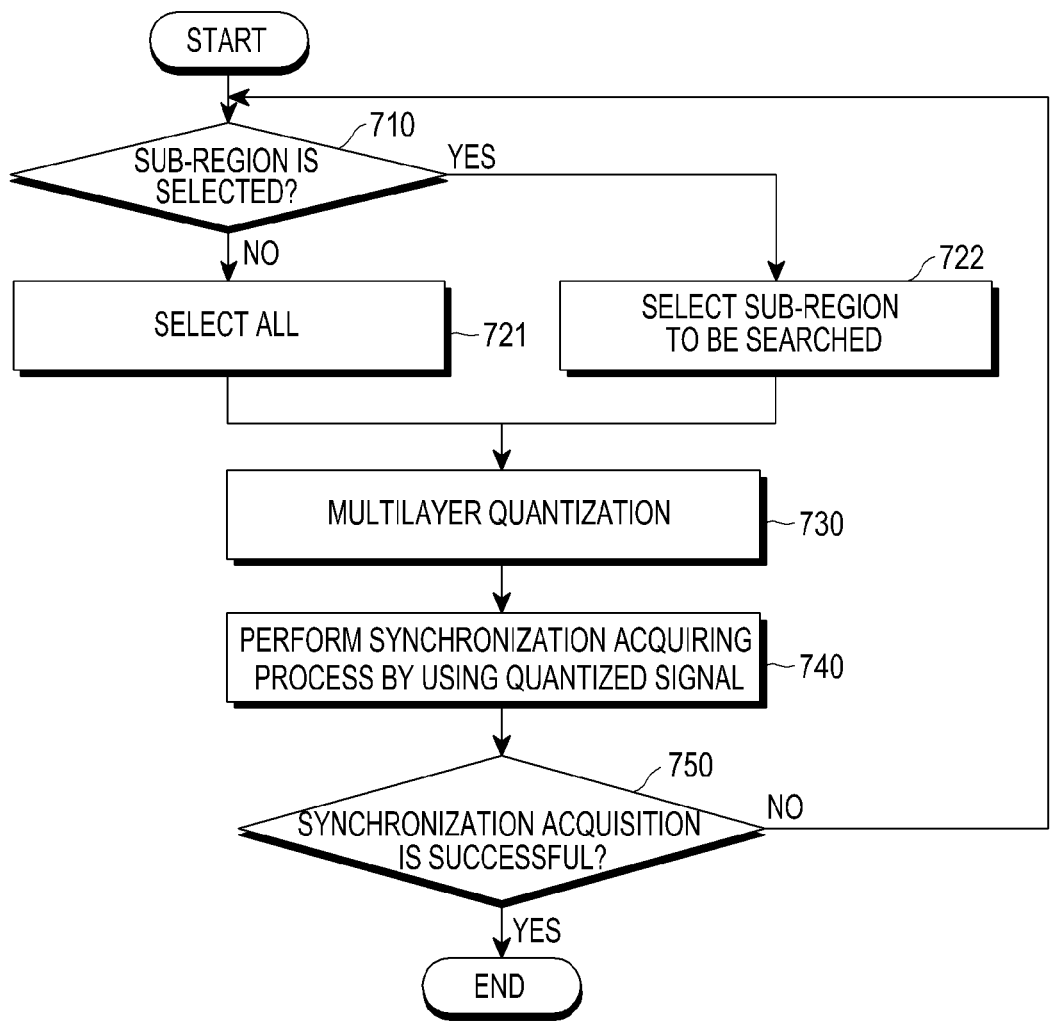
FIG. 7 is a flowchart illustrating an initial synchronization acquisition process according to an exemplary embodiment of the present invention.

FIG. 7 is a flowchart illustrating an initial synchronization acquiring process according to an exemplary embodiment of the present invention.

Referring to FIG. 7, it is identified whether a synchronization acquiring process is to be performed by applying the sub-region selector in step 710, all sub-regions are selected in step 721 when the sub-region selector is not applied, and a sub-region to be searched is selected in step 722 when the sub-region selector is applied. Subsequently, a multilayer quantization for the received signal is performed in step 730, and the synchronization acquiring process is performed by using the quantized signal in step 740. In step 750, it is identified whether detection of a downlink synchronization sequence ID and acquisition of accurate signal reception timing are successful. When they are successful, the first step of the initial synchronization acquisition ends and the second step of detecting mid-ambles based on the detected downlink synchronization sequence ID is performed. Further, when the detection of the downlink synchronization sequence ID is not successful, the process returns to step 710.

Next, a method of reducing probabilities of error generation due to a false alarm through the use of an additional reliability check algorithm according to another exemplary embodiment of the present invention will be described.

In the second step of acquiring the mid-amble ID in addition to the first step of the initial synchronization acquisition, a most effective value is determined using the ML scheme in general. Since the false alarm is generated when the received signal does not exist, the process can proceed to the next step. Further, in the case where the received signal does not exist, when a value which exceeds the threshold is detected, the false alarm is generated, thereby increasing an average cell searching time. In this case, when it is determined that the signal does not exist by comparing sizes of signals corresponding to the candidate group with a predetermined value, the first and second steps are performed again, thereby significantly reducing an overall average cell searching time.

Specifically, timing information of finally available cells and energy information corresponding to the timing information are determined in the first step of the initial synchronization acquisition. According to an exemplary embodiment of the present invention, when a difference in energy of paths of the determined cells is smaller than a predetermined value, it is considered that the false alarm is generated and the first step is performed again. Further, when a difference in correlation values calculated using four mid-ambles is also smaller than a predetermined value in the second step, it is considered that the false alarm is generated and the second step is performed again. As described above, the overall average cell searching time can be reduced through the reliability check method according to the exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of acquiring initial synchronization in a code division multiple access mobile communication system, the method comprising:
    comparing a received signal with a threshold value and mapping the received signal using the threshold value;
    quantizing the received signal into one of a plurality of values based on the result of the comparison;
    calculating correlation values of the quantized received signal and a local code;
    calculating absolute values of the correlation values; and
    detecting a position of a maximum value which exceeds a threshold among the absolute values and an ID of a downlink synchronization (SYNC-DL) sequence and determining timing values of available cells and energy values corresponding to the timing values.

2. The method of claim 1, wherein the quantizing of the received signal comprises differently or identically setting widths in the plurality of values.

3. The method of claim 1, further comprising:
before the quantizing of the received signal, dividing each sub-frame into a plurality of sub-regions and selecting a sub-region where initial synchronization acquisition is to be performed; and
detecting a received signal from the selected sub-region and comparing the detected signal from the selected sub-region with a predetermined threshold to determine effectiveness.

4. The method of claim 3, wherein, when an effective received signal is not detected from the selected sub-region, the received signal is detected from other sub-regions according to a predetermined order.

5. The method of claim 3, wherein a number of sub-regions is determined according to a memory size of the code division multiple access mobile communication system.

6. The method of claim 3, wherein each of the sub-regions is set to overlap another sub-region by a predetermined interval.

7. The method of claim 1, wherein the determining of the timing values comprises comparing a difference between the determined energy values of the cells with a predetermined value, and returning to acquiring the initial synchronization before quantizing the received signal when the difference between the energy values is smaller than the predetermined value.

8. The method of claim 1, further comprising detecting mid-ambles based on the detected ID of the SYNC-DL sequence, wherein detecting the mid-ambles comprises re-detecting the mid-ambles when a difference between energy values of the detected mid-ambles is smaller than a predetermined value.

9. An apparatus for acquiring initial synchronization in a code division multiple access mobile communication system, the apparatus comprising:
a quantizer configured to compare a received signal with a threshold value, to map the received signal using the threshold value, to quantize the received signal, and to map the received signal into one of a plurality of values based on the result of the comparison;
a matched filter configured to calculate correlation values of the quantized received signal and a local code;
an absolute value calculator configured to calculate absolute values of the correlation values; and
a peak detector configured to detect a position of a maximum value which exceeds a threshold among the absolute values and an ID of a downlink synchronization (SYNC-DL) sequence and determines timing values of available cells and energy values corresponding to the timing values.

10. The apparatus of claim 9, wherein the quantizer differently or identically sets widths in the plurality of values.

11. The apparatus of claim 9, further comprising a sub-region selector which divides each sub-frame into a plurality of sub-regions and selects a sub-region where initial synchronization acquisition is to be performed, wherein the sub-region selector detects a received signal from the selected sub-region and compares the detected signal with a predetermined threshold to determine effectiveness.

12. The apparatus of claim 11, wherein, when an effective received signal is not detected from the selected sub-region, the sub-region selector detects the received signal from other sub-regions according to a predetermined order.

13. The apparatus of claim 11, wherein a number of sub-regions is determined according to a memory size of the code division multiple access mobile communication system.

14. The apparatus of claim 9, each of the sub-regions is set to overlap another sub-region by a predetermined interval.

15. The apparatus of claim 9, wherein the peak detector compares a difference between the determined energy values of the cells with a predetermined value, and returns to acquiring initial synchronization before quantizing the received signal when the difference between the energy values is smaller than the predetermined value.

16. The apparatus of claim 9, further comprising a mid-amble detector which detects mid-ambles based on the detected ID of the SYNC-DL sequence, wherein the mid-amble detector re-detects the mid-ambles when a difference between energy values of the detected mid-ambles is smaller than a predetermined value.

* * * * *